United States Patent Office 3,372,033
Patented Mar. 5, 1968

3,372,033
RETINYLIDENE CYANO-ACETIC ACID, ESTERS AND SALTS THEREOF, AS AN EGG YOLK COLORANT EMPLOYED IN POULTRY FEED
Pieter Henri van Leeuwen, Van Houtenlaan, Weesp, Netherlands, assignor to North American Philips Company, Inc., New York, N.Y., a corporation of Delaware
No Drawing. Original application Oct. 3, 1962, Ser. No. 228,126. Divided and this application Feb. 8, 1965, Ser. No. 438,148
Claims priority, application Netherlands, Oct. 16, 1961, 270,292
4 Claims. (Cl. 99—4)

The instant application is a division of United States patent application Ser. No. 228,126, filed Oct. 3, 1962 and now abandoned.

It is known that with the intensification of poultry farming a food is administered to chickens which contains little or no green food, as a result of which the colour of the yolks of the eggs becomes pale yellow.

Attempts have therefore been made to obtain a satisfactory deep-yellow colour of the yolks by means of additions to the food in spite of the lack of green food. In the literature reference is made, for example, to xanthophyll, canthaxanthene and β-apo-8'-carotenal as additions to poultry food to be used for the said purpose. These known compounds, however, can be produced only with difficulty and are expensive owing to their complicated chemical structure.

It has now been found that a satisfactory improvement in the yolk colour can be achieved by using the retinylydene cyano-acetic acid

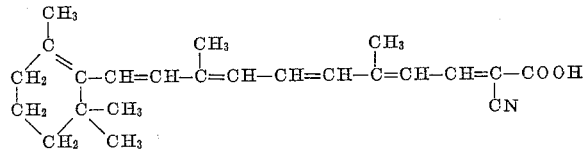

which can be produced fairly easily or a salt or an ester thereof to be added to food.

In accordance herewith the invention relates to a method of producing a food preparation consisting of a mixture of one or more food ingredients and a polyene compound which, taken up in chicken food, furthers the colour of the yolk of the eggs of chickens, and is characterized in that retinylydene cyano-acetic acid or salt or an ester thereof is mixed with one or more food ingredients.

Suitable food ingredients are all food constituents such as kinds of meal, for example wheat meal, oatmeal, barley meal, rye meal, maize flour, wheat bran, soya scrap meal, sesame flake meal, furthermore products rich in animal protein, such as fish flour and blood flour, meat meal and whey powder and furthermore also those constituents which are usually taken up in a low concentration in food, such as minerals, for example chalk, phosphoric acid lime and iodized sodium chloride and iron-, copper-, manganese-, cobalt- and zinc salts and vitamins, for example the vitamins A, B, D, E and K.

Normal food, ready for use, may consist for example, as is known, of a mixture of 90 to 75 parts of meal with a high starch content, and 10 to 25 parts of meal having a high protein content, to which about 3000 to 6000 I.U. of vitamin A, 1000 to 2000 I.U. of vitamin D, 4 to 15 mg. of riboflavin, 8 to 20 mg. of panthothenic acid, 10 to 30 mg. of nicotinic acid, 2 to 10 mg. of vitamin $K_3$, 1 to 5 mg. of Tjiamine, 50 to 200 mg. of choline, 1 to 3 mg. of vitamin $B_6$ are added per kilogram, while furthermore, per kilogram, 20 to 50 g. of a mineral mixture is added, which consists for example of 50 to 80% of chalk, 10 to 40% of phosphoric acid lime, 2 to 8% of iodized sodium chloride, 0.3 to 1% of ferrous sulphate, 0.2 to 0.8% of manganese sulphate and 0.05 to 0.5% of copper sulphate.

Such a ready food according to the invention contains preferably per kilogram 5 to 100 mg. of the novel colouring substance, though lower concentrations may be employed successfully, for example, if the food contains constituents rich in pigment substance by nature, for example, a yellow maize meal of high quality.

An example of a food preparation according to the invention is formed by a ready food as described above with which 5 to 100 mg. of the novel colouring substance is intimately mixed.

In accordance with the invention food preparations are preferably produced which contain the novel colouring substance in a much higher concentration, for example from 0.1 to 10% by weight, these preparations are particularly suitable to be mixed by the supplier of the food ready for use or by the poultry farmer with a large quantity of normal food to obtain a mixture of 5 to 100 mg. of the novel colouring substance.

For producing such a preconcentrate use may be made of a food containing already all ingredients of the final food in the ratios desired for the ready food, but the novel colouring substance will preferably be preliminarily mixed with only one or with a mixture of a few constituents of the ready food.

A food preparation according to the invention is preferably obtained by mixing 100 parts of the novel colouring substance in a finely powdered state with 1000 to 10,000 parts of one of the kinds of flour conventionally used for poultry food, for example, oatmeal, wheat meal, barley meal or maize flour.

Particularly those food preparations according to the invention are important which contain, apart from the novel colouring substance, one or more of the further substances to be added to the ready food in small quantities, for example vitamins and/or minerals in a concentrated form, the ratio being such that by mixing the preconcentrate with a large quantity of a food not yet containing these constituents, a ready food for the correct composition is obtained. For example, 5 to 100 g. of the novel colouring substance, 3,000,000 to 6,000,000 I.U. of vitamin A, 1,000,000 to 2,000,000 I.U. of vitamin $D_3$ are mixed with 1 kg. of meal, for example oatmeal or wheat flour, so that a food preparation is obtained, which, when mixed with an approximately thousandfold quantity of a normal food not yet containing these vitamins a food of the correct composition for use is obtained.

If desired, such a preconcentrate may be provided also with the further vitamins and/or the required minerals in a concentrated form.

In accordance with the invention a so-called food core may be prepared, which consists of a mixture of products rich in protein, for example blood flour, fish flour, meat flour and whey powder, vitamins, minerals and the novel colouring substance, so that by adding one or more of the ordinary starch-containing kinds of meal, for example oatmeal, barley meal or maize flour in a ratio of 10 to 2 to 1 a food ready for use is obtained.

The retinylydene cyano-acetic acid, like the salts and the esters thereof, is a compound not yet described in the literature, which compound can be produced, however, by methods known per se for producing this type of compounds and by analogous methods.

This compound or an ester thereof may be produced, for example, by condensing vitamin A aldehyde (retinene) by the Knoevenagel condensation with cyano-acetic acid or an ester thereof. This reaction may be carried out by the methods described for Knoevenagel condensations in general in Houben-Weyl, 4th edition, volume IV, Part 2, page 31 and for these condensations in the vitamin A sequence in "Berichte" 72b, 1391 (1939) and Recueil 71, 900 (1952).

Use is preferably made of esters of retinylydene cyano-acetic acid, since the stability of these compounds appeared to be best. Reference may be made in particular to the esters of aliphatic alcohols having 1 to 18 carbon atoms, for example the methyl-, ethyl-, propyl-, lauryl-, cetyl-, stearyl-, or oleyl-ester.

These esters may be obtained not only by the Knoevenagel condensation with retinene with the corresponding ester of cyano-acetic acid, but also by the esterification of retinylydene cyano-acetic acid by a method usually employed for esterification.

Suitable salts of retinylydene cyano-acetic acid are for example, alkali- or earth-alkali salts such as the Na-, K-, Ca-, or Mg-salt.

Very satisfactory results were obtained, for example, with methylester of retinylydene cyano-acetic acid. A group of hens in lay received a food poor in pigment and it was found after some weeks that the colour of the yolks had become pale yellow. Half of the number of hens of this group then received the same food mixed with retinylydene cyano-acetic acid methyl ester, whereas the other animals, as a check group, received the food without the new addition. After a few days the colour of the yolks with the animals fed on the new poultry food had the normal deep-yellow colour, whereas the check animals continued laying eggs having pale yellow yolks. No difference was stated in the behaviour for example in the appetite or in the quantity of eggs of the animals fed on the new food.

*Example I.—Retinylydene cyano-acetic acid*

70 g. of vitamin A aldehyde (retinene), 30 g. of cyano-acetic acid, 5 g. of ammonium acetate and 5 g. of acetamide in 300 ml. of benzene and 200 ml. of acetic acid were refluxed, whilst stirring, for four hours and the water produced was removed by means of a watertrap. After cooling of the reaction mixture 500 ml. of diethylether was added, after which the mixture was washed with water. Then the acid was taken up from the organic liquid by washing it with 500 ml. of an aqueous 1 N NaOH solution. After this water phase had been washed twice with 100 ml. of diethylether, it was acidified with 300 ml. of 2 N sulphuric acid and extracted with 3×250 ml. of diethylether. The collected ether extracts were freed from acid by washing, after which the ether was distilled off under reduced pressure. The residue was crystallized from ethanol, so that the crystalline retinylydene cyano-acetic acid having a melting point of 198° C. and a $E_{1cm.}^{1\%}$ value of 1390 with 442 m$\mu$ was obtained.

*Example II.—Retinylydene cyano-acetic acid methylester*

0.1 mol retinylydene cyano-acetic acid was boiled with 12.5 ml. of dimethylsulphate and 30 g. of $K_2CO_3$ in 500 ml. of acetone for one hour while refluxing.

The reaction mixture was cooled to about 35° C. and 25 mol concentrated ammonia was added. After being kept for 30 minutes, whilst shaking occasionally, the reaction mixture was poured out in 1500 ml. of water and extracted twice with 250 ml. of methylene dichloride. The collected organic layers were washed with 250 ml. of 2 N $H_2SO_4$, 250 ml. of 5% $NaHCO_3$ solution in water and twice with 250 ml. of water. The solvent was then distilled off under reduced pressure and the residue was absorbed in 1 litre of boiling methanol. Then the retinylydene cyano-acetic acid methylester was caused to crystallize out at room temperature. This ester has an $E_{1cm.}^{1\%}$ value (453 m$\mu$) of 1475 and a melting point of 145 to 145.5° C.

*Example III.—Retinylydene cyano-acetic acid ethylester*

0.1 mol of retinene, 0.1 mol cyano-acetic acid ethylester, 80 ml. of propionic acid and 0.04 mol of $NH_3$ were mixed with 200 ml. of benzene in a reaction bulb provided with an agitator and a water trap. The contents of the bulb were boiled for one hour while refluxed and then cooled. The reaction mixture was poured out in 500 ml. of water, shaken thoroughly and after sharp separation of the water layer it was washed twice with 250 ml. of 2 N NaOH. Then the mixture was washed with water until the washing water reacted neutrally. The benzene was removed by distilling under reduced pressure. The residue was absorbed in 250 ml. of petroleumether (40–60°), the reaction product crystallizing immediately out. After recrystallisation from ethanol the aforesaid ester was obtained in the pure state; it had a melting point of 147° C. and an $E_{1cm.}^{1\%}$ value (453 m$\mu$) of 1400

*Example IV.—Retinylydene cyano-acetic acid cetylester*

By replacing the ethylester of cyano-acetic acid of the reaction described in Example III by the cetylester of cyano-acetic acid, the retinylydene cyano-acetic acid cetylester was obtained, which had a melting point of 88° C. and a $E_{1cm.}^{1\%}$ value (454 m$\mu$) of 910

*Example Va*

1 kg. of a poultry food containing a mixture of:

| | Parts |
|---|---|
| Maize meal | 300 |
| Barley meal | 200 |
| Oatmeal | 200 |
| Soya scrap meal | 50 |
| Sesame flake meal | 25 |
| Wheat chalk bran | 50 |
| Herring meal | 100 |
| Whey powder | 50 |
| Chalk | 15 |
| Phosphoric acid lime | 5 |
| Iodized sodium chloride | 2.5 |
| Ferrosulphate | 1.5 |
| Manganese sulphate | 0.8 |
| Copper sulphate | 0.2 |

Comprising per kilogram:

| | | |
|---|---|---|
| Vitamin A | I.U. | 5,000,000 |
| Vitamin $D_3$ | I.U. | 1,000,000 |
| Riboflavin | g. | 1.5 |
| Pantothenic acid | g. | 2.5 |
| Nicotinic acid | g. | 4 |
| Thyamine | g. | 0.5 |
| Vitamin $B_6$ | g. | 0.25 |
| Vitamin $K_3$ | g. | 1 | was mixed with 50 g. of finely powdered retinylydene cyano-acetic acid methylester.

*Example Vb*

By mixing one part of the food preparation as described in Example Va with 100 parts of the same poultry food without the new colouring substance a poultry food was obtained, which contained the colouring substance in such a concentration that the eggs of hens fed on this new food exhibited a markedly better colour of the yolks than those of hens fed on the same food without the novel colouring substance.

*Example VI*

1 kg. of oatmeal was thoroughly mixed with 5,000,000 I.U of vitamin A and 1,000,000 I.U. of vitamin $D_3$—which were worked up together in a conventional manner to form a dry powdery preparation containing 325,000 I.U. of vitamin A and 65,000 I.U. of vitamin D per gram—together with 25 g. of retinylydene cyano-acetic acid cetylester in the form of a dry powder.

This preparation is suitable for mixing in a ratio of 1 part to 1000 parts of a conventional poultry food, to which no vitamin A and $D_3$ has yet been added, so that a food ready for use is obtained.

*Example VII*

A preparation according to the invention, containing the vitamins usually added to poultry food together with the novel colouring substance in a suitable ratio and mixed in a ratio of one part to 1000 parts of the normal food without vitamin additions in order to obtain a food ready for use, may have the composition:

| | | |
|---|---|---|
| Vitamin A | I.U. | 5,000,000 |
| Vitamin $D_3$ | I.U. | 1,000,000 |
| Riboflavin | g. | 1.5 |
| Panthotenic acid | g. | 2.5 |
| Nicotinic acid | g. | 4 |
| Vitamin $K_3$ | g. | 1 |
| Vitamin E | I.U. | 1250 |
| Choline | g. | 25 |
| Vitamin $B_{12}$ | mg. | 2 |
| Retinylydene cyano-acetic acid methylester | g. | 50 | mixed with oatmeal and replenished to 1 kilogram.

*Example VIII*

1 kg. of the preparation described in Example VII was mixed with 20 kg. of a mineral mixture containing 70 parts of chalk, 25 parts of phosphoric acid lime, 3.25 parts of iodized sodium chloride, 0.75 part of $FeSO_4$, 0.40 part of $CuSO_4$ and 0.60 part of manganese sulphate, so that a food preparation according to the invention was obtained, which contained all low-concentration constituents to be added to meal for producing about 1000 kg. of good poultry food.

*Example IX*

20 kg. of the preparation described in Example VIII was mixed with 100 kg. of herring meal and 30 kg. of whey powder, so that a food core was obtained, containing proteins, minerals and the novel colouring substance in such a ratio that by adding a 6- to 8-fold quantity of an ordinary kind of meal having a high starch content, a good food ready for use is obtained.

What is claimed is:

1. A poultry feed preparation comprising at least one poultry feed ingredient and a compound selected from the group consisting of retinylydene cyanoacetic acid, esters of said acid and salts of said acid with alkali metals and alkaline earth metals.

2. The poultry feed preparation of claim 1 wherein an ester of retinylydene cyanoacetic acid and an aliphatic alcohol of 1 to 18 carbon atoms is employed.

3. The poultry feed preparation of claim 2 wherein the methyl ester of retinylydene cyanoacetic acid is employed.

4. A method of improving the color of chicken egg yolks comprising feeding chickens with a poultry feed preparation comprising at least one poultry feed ingredient and a compound selected from the group consisting of retinylydene cyanoacetic acid, esters of said acid and salts of said acid with alkali metals and alkaline earth metals.

References Cited

UNITED STATES PATENTS

| | | | |
|---|---|---|---|
| 2,583,194 | 1/1952 | Weisler | 260—464 X |
| 3,014,052 | 12/1961 | Guex et al. | 99—107 X |
| 3,021,355 | 2/1962 | Eiter et al. | 260—464 |
| 3,190,898 | 6/1965 | V. Geelen et al. | 260—404 X |
| 3,244,741 | 4/1966 | Zevenluizen | 260—404 X |

FOREIGN PATENTS 684,757  12/1952  Great Britain.

A. LOUIS MONACELL, *Primary Examiner.*

H. H. KLARE, *Assistant Examiner.*